Jan. 30, 1923.
H. SCHMIDT.
SLAB AND THE LIKE FOR CONSTRUCTIONAL PURPOSES.
FILED MAR. 7, 1921.
1,443,385
4 SHEETS-SHEET 1
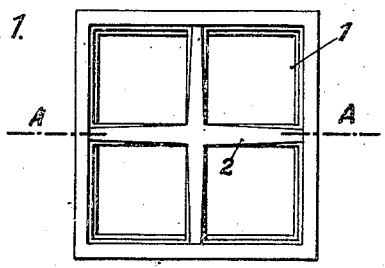
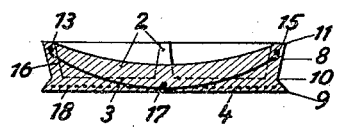
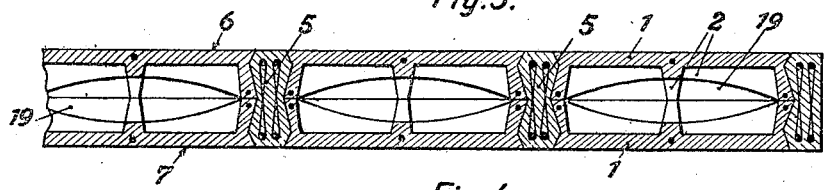
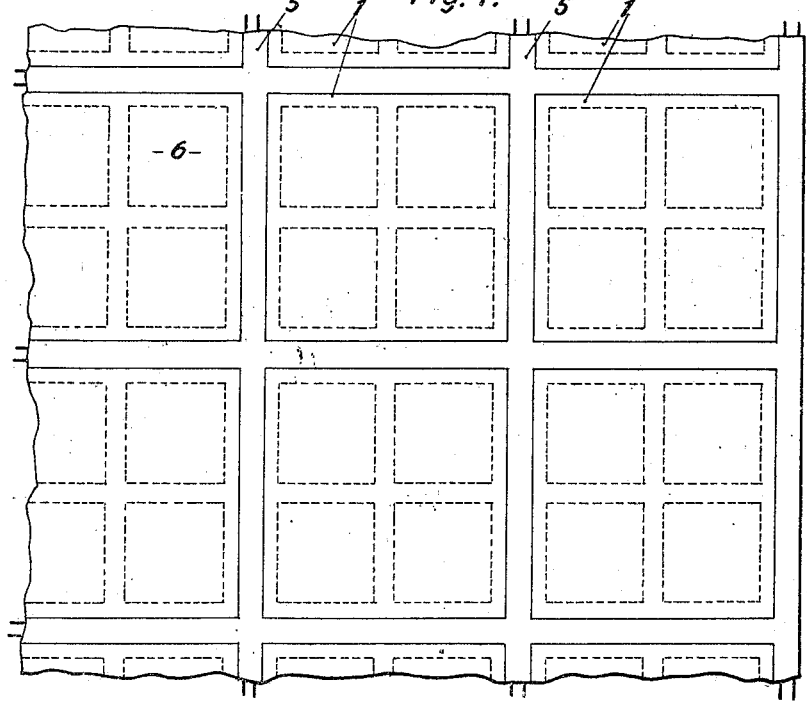
Inventor:
H. Schmidt
By Marks & Clerk
Attys Jan. 30, 1923.    1,443,385
H. SCHMIDT.
SLAB AND THE LIKE FOR CONSTRUCTIONAL PURPOSES.
FILED MAR. 7, 1921.    4 SHEETS-SHEET 2
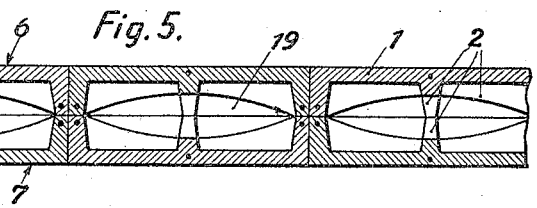
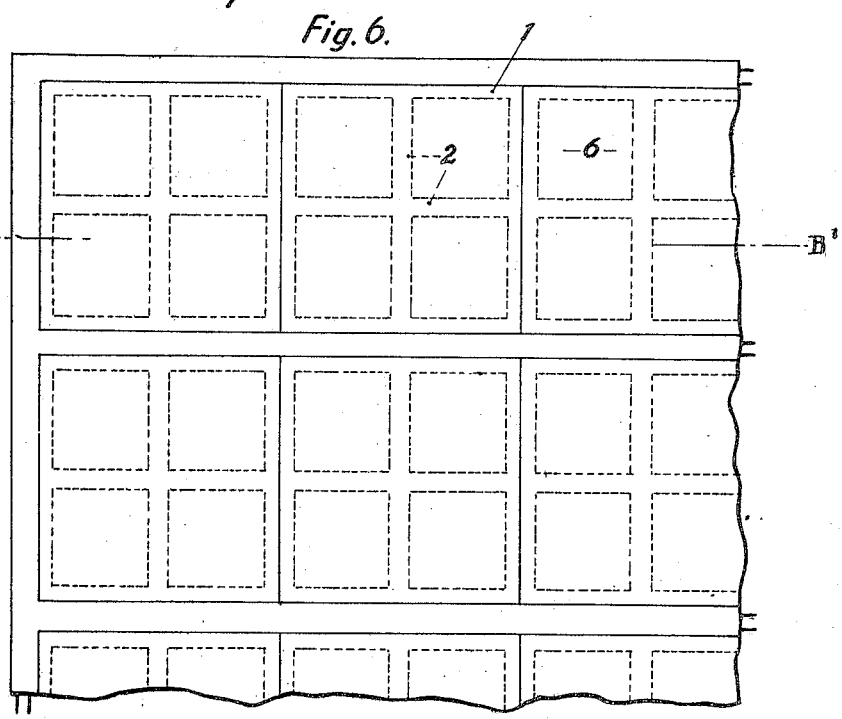
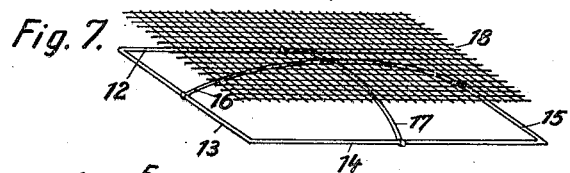
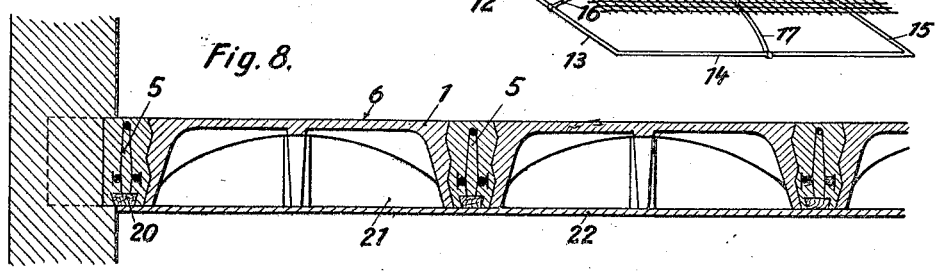
Inventor:
H. Schmidt,
By Marker Clark
Attys.

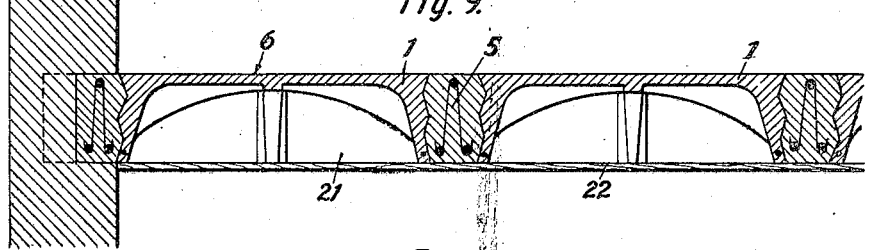
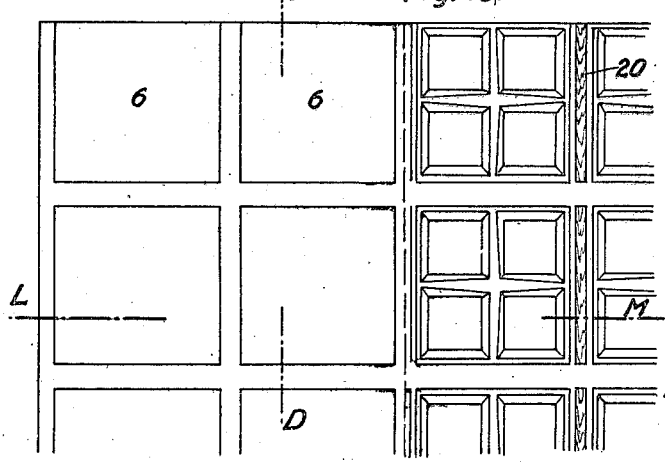
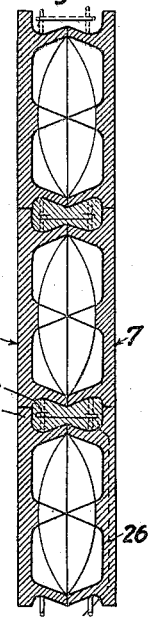
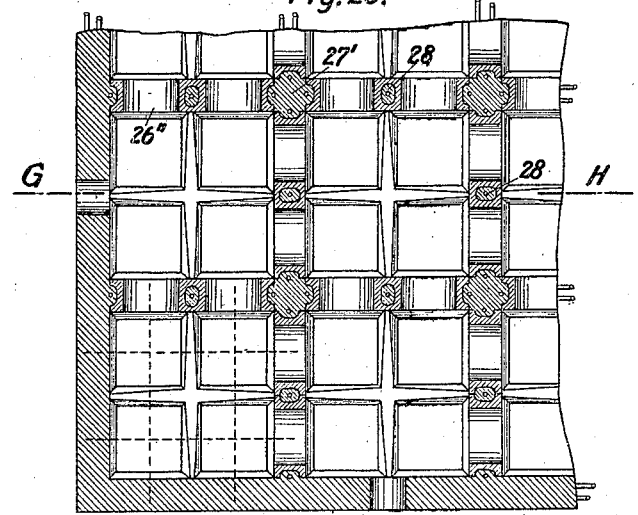
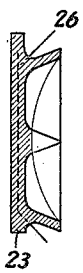

Jan. 30, 1923. 1,443,385
H. SCHMIDT
SLAB AND THE LIKE FOR CONSTRUCTIONAL PURPOSES.
FILED MAR. 7 1921. 4 SHEETS-SHEET 4
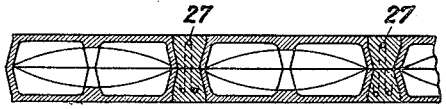
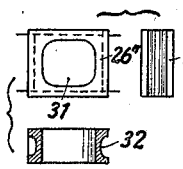
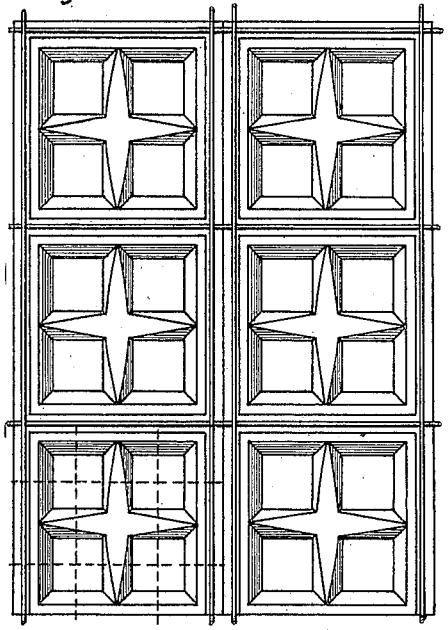
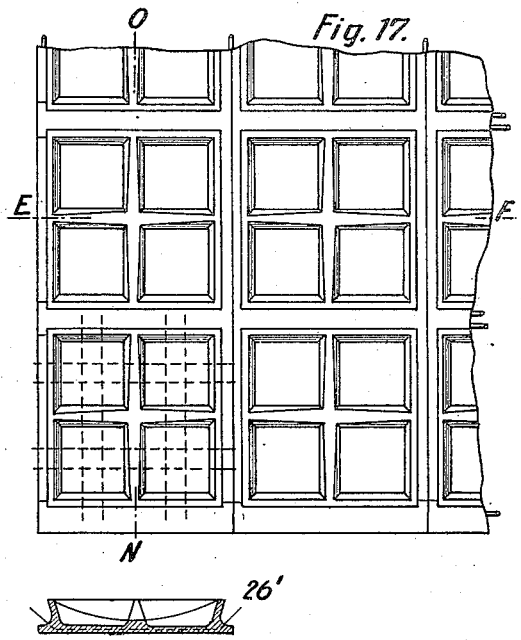
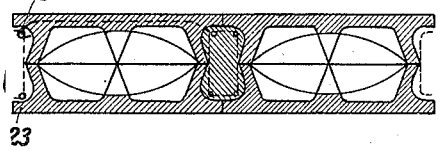
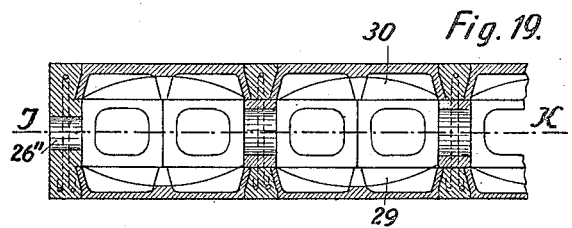
Inventor:
H. Schmidt,
By Marks & Clerk
Attys.

Patented Jan. 30, 1923.

1,443,385

UNITED STATES PATENT OFFICE.

HEINRICH SCHMIDT, OF MALAGA, SPAIN.

SLAB AND THE LIKE FOR CONSTRUCTIONAL PURPOSES.

Application filed March 7, 1921. Serial No. 450,507.

*To all whom it may concern:*

Be it known that I, HEINRICH SCHMIDT, a citizen of Jugo-Slavia, residing at No. 1 Calle de Don Juan, Malaga, Spain, have invented certain new and useful Improvements in and Relating to Slabs and the like for Constructional Purposes (for which I have filed application in Spain, March 22, 1919), of which the following is a specification.

This invention relates to hollow blocks or slabs made of reinforced concrete or other material and its object is to construct them so as to be particularly advantageous when compared to similar materials as have hitherto been proposed, for any use whatever. It is a known fact that for a long time it has been tried to construct walls, balconies, etc., which shall have at the same time a high resistance and a small weight. Numerous experiments have been made in that direction without any results, because the various improvements which have been proposed were either too expensive or the weight used too great, or the resistance of the materials too small.

According to the present invention a block for constructions in reinforced concrete or similar material is obtained which forms in itself a pavement having all properties of strength and lightness which are required and capable of being placed in position in a simple manner without any complicated installation being required.

Various modes of construction according to the present invention are shown by way of example in the accompanying drawings in which:

Figure 1 shows the inside of a block or slab for constructions, provided with projections which form reinforcements curved in the form of an arc of a circle.

Figure 2 is a section along A—A of Figure 1 which shows the curved shape of the reinforced extensions of metallic rods, and of another metallic reinforcement for the surface.

Figure 3 is a vertical section showing the arrangement of the slabs and of the reinforcement.

Figure 4 shows diagrammatically a wall with the various blocks and their reinforcements in all directions with their connection with the slabs, Figure 5 is a vertical section through the wall on the line B—B of Fig. 6 (the transverse reinforcement not being shown).

Figure 6 shows the outside appearance of a pavement having reinforcements in one direction only, that is in the direction of the greatest width, Figure 7 is a perspective view of the metallic reinforcements of the blocks, Figure 8 is a longitudinal section along the line L—M of Figure 10 of a roofing constructed according to a modification of the invention, Figure 9 is a section along the line C—D of Figure 10, Figure 10 is a plan view inside and outside a roofing constructed as shown in Figure 8, Figure 11 is a vertical section through a hollow wall constructed with slabs according to the present invention, Figure 12 shows the respective positions of the various blocks of the armature of the concrete supplementary rods and of transverse members, Figure 13 is a longitudinal section through a hollow wall of the same kind, Figure 14 is a section made in one half of a block used for the construction of a wall, Figures 15 and 16 are sections along the lines N—O and E—F of Figure 17, Figure 17 is an elevation on line $D^1$—$D^1$ of Fig. 16 of a hollow wall constructed by means of slabs, Figure 18 is a section through the lower half-block, Figure 19 is a section along the line G—H of Figure 20 of a pavement for a platform or terrace made of slabs combined with cement blocks of a particular shape, Figure 20 is a horizontal section along the line J—K in Figure 19.

Figure 21 is a half block considered separately, and

Figure 22 is a block of cement serving to fill the interstices.

As shown in the drawings, each block of construction, that is each slab is composed of two equal halves (see Figure 3) arranged above each other in such a manner as to form one whole having two flat external surfaces 6 and 7 at the upper and lower part. The contact surfaces of the two half blocks form an undulated line 8 which commences at the end 9 and extends towards the inside part 10 so as to form a projection 11 at exactly the middle part in such a manner as to obtain an M which is widely open (see Figure 3), the legs of the M being inclined towards the outside.

Owing to the said particular shape of the lateral walls of the blocks, an interval or channel is formed between the latter having a characteristic transverse section with two recesses in its middle. The said mode of construction is very practical. If necessary, the distance between each of the blocks, or in other words the thickness of the reinforcement 5, may be increased a little but by doing so it should be kept in mind that the strength of the girder or of the walling depends on the strength of the reinforcement and on the distance that separates the various blocks. As shown in the drawing, the various blocks have a rectangular shape and are made of concrete with a metallic reinforcement. The reinforcement consists (see Figure 7) of four iron rods 12, 13, 14, 15 that is one rod on each side. The said iron rods are interconnected at their middle by means of two rods 16 and 17 which are curved in an arc of a circle and cross each other. Moreover, an iron trellis with small meshes is placed in the plane of highest sag of the block. When such a reinforcement is filled with cement it forms a block of construction having the properties which have been mentioned above, and having a considerable free space in its middle. By placing afterwards such blocks next to each other or above each other an arrangement is obtained as shown in Figures 3–5 which has on the inside a perfect cavity 19 having the shape of a calotte. The extensions 9 which are designed to receive the wire armature 18 are arranged in such a manner as to coincide with the subjacent half slab. Four small intermediate spaces are thus formed which are covered by the subjacent lateral faces 11 as seen at 5 and it may be filled if necessary with cement mortar reinforced with metallic wire.

A wall constructed as described above is particularly suitable for hot countries, in view of the fact that the hollow spaces existing between the various blocks form a series of ventilating channels which prevent an excessive heating of the whole arrangement. Moreover, as the upper layer of half blocks has only a reduced contact surface with the lower layer, the transmission of a rise of temperature from one layer to the other will be less rapidly effected than in the case when the two blocks form one monolith only. Besides the differences mentioned above, the facility with which the new constructional stone can be placed in position for the construction of roofings or girders, should be mentioned since according to the mode of construction described above it is possible to obtain a high precision without any great difficulty. It is possible to obtain in a very simple manner a transparent or glass roofing in which it is enough to fill the joints of the framing with cement by making the reinforced blocks of glass. As a last advantage of the new blocks of construction, their resistance and their being non-combustible should be mentioned which qualities ensure their indestructibility. They have in the average a side of 60 centimeters by 2 to 7 centimeters thickness.

The slabs illustrated in Figure 8 are different from those described above only in this that the supporting girders 5 made of reinforced concrete are provided also with an inner reinforcement made of ordinary constructional wood. However, the said reinforcements are utilized for secondary girders only without the load being modified at all as shown clearly in the figure.

The plan view according to Figure 10 explains the relative position of the said wooden annexes in the whole of the construction.

The upper surface 6 of the slabs is plane; it is that surface that constitutes the pavement surface of the dwellings. The two halves of the blocks of construction have not been superposed. It is also possible to construct a flat roofing. The inside face of the latter has recesses 21 which can be covered by a ceiling 22 as shown in the figure.

Instead of supporting the slabs on transverse members made of wood, metallic supports of lattice work may be used. The mode of construction shown in Figures 8–10 can of course be applied to the construction of the transparent roofings or glass roofings above mentioned.

Another mode of construction of the wall is shown in Figures 11–14. As shown in Figure 14 the arrangement of the blocks is different from the form which has been previously described, in this that the flat surfaces 6 and 7 have been extended (23) in such a manner that closed cavities 24 are formed between the various blocks which cavities can be filled with cement, reinforced if necessary, in such a manner as to form a kind of secondary support 25. After the placing in position of the first row of blocks a transverse channel 24 is formed between the latter and the second row which channel is filled with cement mortar like the other hollow spaces; lastly, the narrow groove of the upper face is also cemented.

The slabs or blocks may receive various shapes and dimensions. If they are intended for hollow walls they will have for instance a thickness of 6 centimeters and a side of 50 centimeters. Their diameter will have accordingly an average of 6 to 25 centimeters. When the blocks are intended for the construction of walls of considerable height and strongly loaded, each of them will be advantageously reinforced with a metallic piece 26. The number and the kind of parts of which each separate reinforcement is composed will be chosen according to the particular requirements of each case; it is also possible, as shown in Figure 7, to use a metallic trellis as a reinforcement. The ends of the wire 26 may be connected to a common support as shown in Figures 11 and 14.

Another mode of construction, shown in Figures 15–18, consists essentially in the special shape of the transverse section of the block, the lower side of the flat surface having a recess 26′ (see Figure 16). All the blocks are traversed by a reinforcing wire 27 the ends of which are connected to the secondary iron girder.

Another use of the blocks is illustrated in Figures 19–22. The slabs (Figure 21) which serve here for assembling the wall are the same as those shown in Figures 1 and 2. After placing the lower half layer of blocks 29, the hollow spaces are filled with cement. These small hollow blocks of cement 26″ (see Fig. 22) are afterwards superposed and are connected to the slabs and to each other by means of a reinforcement consisting of a metallic trellis, iron for instance, connected in its turn to the secondary support. The recesses 27 and 28 are filled with cement mortar. The layer of blocks 26 is covered with the upper half-layer 30 of the blocks or slabs whereby the structure is given a greater thickness with increase of strength. It is possible in this manner to construct the pavement of a platform or terrace illustrated in Figure 19. The apparent interstices and the upper end of the support are then cemented in their turn after the iron wires of the reinforcement have been tensioned. The said interposing or distance blocks have a rectangular shape and are provided at their middle with a suitable recess 31. The narrow sides are provided with grooves 32 which can serve if necessary, as ventilating channels.

The use of blocks of various heights is to be recommended so as to obtain an inclined floor with a view to eliminating any deposits.

What I claim is:—

1. For constructional purposes a reinforced hollow block or slab comprising a rectangular base, side walls for same and cross ribs forming a hollow or recessed block in combination with reinforcements within said walls and curved reinforcements in the ribs that cross each other.

2. A hollow block as claimed in claim 1 in combination with a metallic trellis reinforcement within the base portion.

3. A hollow block as claimed in claim 1, the material being comprised of glass in combination with a metallic trellis reinforcement within the base portion.

4. Hollow reinforced blocks according to claim 1, in combination with metallic trellis reinforcement within the base portion of the blocks, said blocks being superposed to form a hollow construction flat on both surfaces, the interior providing ventilating spaces or channels which prevent the transmission of heat.

5. A structure comprising hollow reinforced blocks according to claim 1, metallic reinforcements within the base portion of the blocks, said blocks being superposed to form a hollow construction flat on both surfaces, the interior providing ventilating spaces in combination with small hollow blocks of rectangular shape that are interposed between the upper and lower layers of the hollow blocks, cement mortar being filled in the free spaces thus formed.

In testimony whereof I have signed my name to this specification.

HEINRICH SCHMIDT.